(12) United States Patent
Irmer et al.

(10) Patent No.: US 7,115,894 B2
(45) Date of Patent: Oct. 3, 2006

(54) METHOD TO DETERMINE THE LUBRICANT FILLING DEGREE OF A FLUID DYNAMIC BEARING

(75) Inventors: Norbert Irmer, Villingen-Schwenningen (DE); Carsten Etling, Spaichingen (DE); Guido Schmid, Triberg (DE)

(73) Assignee: Minebea Co., Ltd., Miyota-machi (JP)

( * ) Notice: Subject to any disclaimer, the term of this patent is extended or adjusted under 35 U.S.C. 154(b) by 150 days.

(21) Appl. No.: 10/887,580

(22) Filed: Jul. 9, 2004

(65) Prior Publication Data

US 2005/0015989 A1   Jan. 27, 2005

(30) Foreign Application Priority Data

Jul. 25, 2003 (DE) .................. 103 35 386

(51) Int. Cl.
*G01F 23/00* (2006.01)

(52) U.S. Cl. .................. 250/577; 29/898.1; 29/898.02

(58) Field of Classification Search ............... 29/898.1; 250/357.1, 227.25, 573–577, 900–908
See application file for complete search history.

(56) References Cited

U.S. PATENT DOCUMENTS

2002/0097931 A1* 7/2002 Saito ..................... 384/107
2003/0221317 A1* 12/2003 Kaimi .................... 29/898.02

FOREIGN PATENT DOCUMENTS

JP        2001-90733        4/2001

* cited by examiner

*Primary Examiner*—Thanh X. Luu
*Assistant Examiner*—Tony Ko
(74) *Attorney, Agent, or Firm*—Lipsitz & McAllister, LLC

(57) ABSTRACT

In order to improve a method to determine the lubricant filling degree of a fluid bearing in which the bearing gap of the fluid bearing is illuminated and the luminous reflectance is analyzed so that the filling degree can be determined in a simple and reproducible manner, it is provided that a spatial intensity profile of the reflected light is recorded.

22 Claims, 4 Drawing Sheets

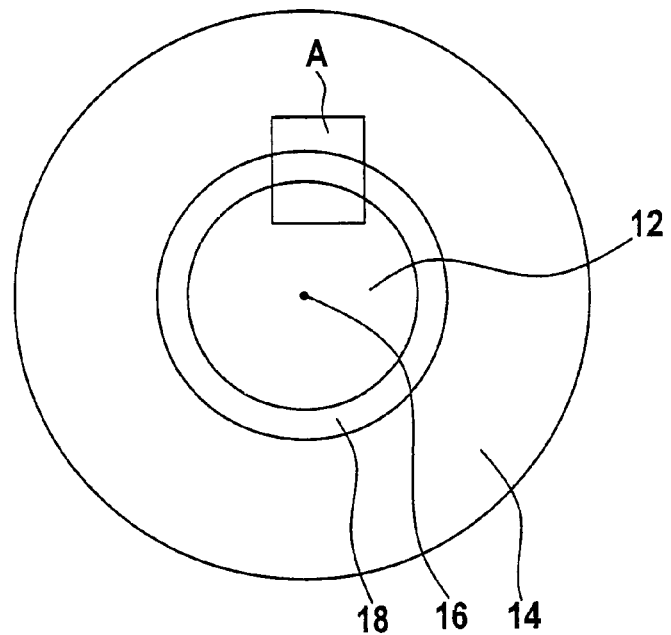
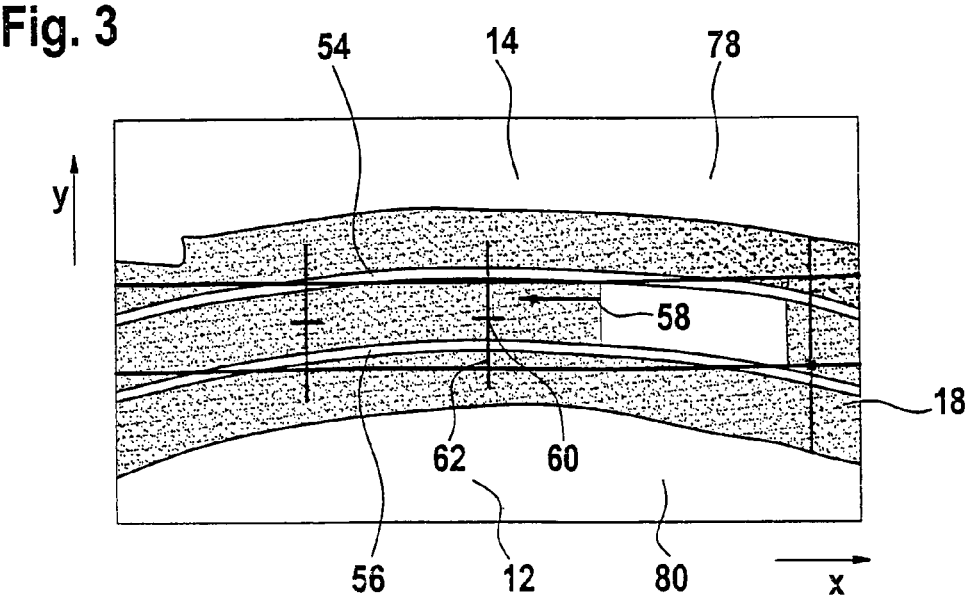

METHOD TO DETERMINE THE LUBRICANT FILLING DEGREE OF A FLUID DYNAMIC BEARING

The present disclosure relates to the subject matter disclosed in German application No. 103 35 386.0 of Jul. 25, 2003, which is incorporated herein by reference in its entirety and for all purposes.

BACKGROUND OF THE INVENTION

The invention relates to a method to determine the lubricant filling degree of a fluid bearing in which the bearing gap of the fluid bearing is illuminated and the luminous reflectance is analyzed.

Hydrodynamic bearings, also called fluid bearings, are used, for example, for the rotary bearing of high-precision spindle motors as employed in hard disk drives. Compared to ball bearings, hydrodynamic bearings display high running precision and silent running combined with much higher shock resistance (robustness). They operate almost noiselessly and practically without wear and tear since at nominal speed there is no direct physical contact involving dry friction between the bearing parts that rotate in relation to each other. Between the shaft and the shaft receptacle (bearing sleeve), there is a thin layer of lubricant, such as a lubricant oil.

A method to determine the lubricant filling degree of a fluid bearing is known, for example, from JP 2001-090733 A. Using such a method, it is possible to check whether the desired filling level has been achieved during the manufacture of the bearing, that is while it is being filled or also after it has been filled.

SUMMARY OF THE INVENTION

In accordance with the invention, the filling degree can be determined in a simple and reproducible manner.

In accordance with the invention, a spatial intensity profile of the reflected light is recorded.

It is known that with an appropriate arrangement and form of the optical system and for specific filling levels of the bearing gap, two relative reflection maxima result whose distance apart provides a measure for the filling degree. The spatial intensity profile is determined in accordance with the invention, from which in turn the reflection maxima can be determined in a simple manner that can particularly be automated. The distance between the reflection maxima can then be automatically determined in order to again determine the filling degree.

The form of the intensity profile is characteristic for the way the lubricant is distributed in the bearing gap. This means, for example, that it is possible to detect whether during an evacuation process, lubricant has escaped or is escaping from the bearing gap.

The method according to the invention also enables the filling degree to be determined on a time-resolved basis in order to directly establish, for example, a "blow-out" process during evacuation.

Since the intensity profile is spatially recorded so that automatic analysis of the relevant intensity data can take place, the filling degree can again be determined with high reproducibility (particularly via the distances between reflection maxima).

Fluid bearings can be measured at a faster rate since the method according to the invention makes use of automatic and particularly computer-supported analysis.

It is advantageous if the spatial intensity profile is recorded in a defined measuring plane. This ensures that it is easily and speedily analyzed; the measuring plane is preferably chosen in such a way that an optimized contrast results.

In particular, the measuring plane is defined with respect to a reference point of the fluid bearing. This enables a measurement to be made easily and quickly since the measuring plane can be adjusted easily and quickly.

It is moreover favorable if the intensity profile is recorded using a stationary camera. The camera can be moveably adjusted vis-à-vis the measured object in order to achieve an optimal setting. It is then favorable if the position of the camera in relation to the measured object is not changed again once this optimal setting has been achieved. If measurement is taking place around the circumference of the bearing gap, then it is advantageous if the fluid bearing is rotated in appropriate angular stages in relation to the camera during non-measurement times.

The spatial intensity profile can be recorded easily if a CCD camera registers the back-reflected light. The spatial intensity distribution can be easily determined using such a camera.

In particular, the intensity profile is then analyzed with respect to the recognition of (relative) reflection maxima. The filling degree can be determined from the distance between the (main) reflection maxima. If there are no such (main) reflection maxima, the filling status of the bearing gap can then at least be qualitatively inferred.

In particular, the distance between relative reflection maxima is determined in order to thus achieve a measurement for the filling degree.

It is particularly advantageous if analysis takes place in a pre-defined spatial measurement window. Optimization of the contrast in particular can be achieved via this kind of measurement window in order to again ensure simple analyzability with high precision.

It is especially advantageous if the analysis is performed automatically and particularly on a computer-supported basis. This enables measurement results with high reproducibility to be obtained. Moreover, the lubricant filling degree can be determined at a fast rate.

If the intensity profile is determined by means of a camera, it is then preferably analyzed using image processing techniques.

A digital filter in particular can be used for the analysis in order to generate a non-linear profile, for example, from the measured intensity profile which goes to facilitate analysis.

The optical system, comprising a light source and camera, is preferably set in such a way that the center of a spatial measurement window lies in the middle between two reflection lines. This enables a position for a fluid bearing and a specific type of fluid bearing to be achieved which is optimized in terms of focus and contrast. In particular, self-calibration in respect of the contrast can be achieved.

The contrast is preferably adjusted automatically with respect to the positioned measurement window in order to obtain a measurement analysis that does not require any intervention from the operator.

In order to determine the filling degree over the entire circumference of the bearing gap, the bearing is preferably turned between measurements with the camera being held at a fixed distance from the bearing.

Provision can be made for the fluid bearing to be filled with lubricant under normal pressure (atmospheric pressure). Here, there is the basic risk that air pockets are formed in the lubricant in the bearing gap. Such air pockets are not desirable since they have a detrimental effect on the operating characteristics of the fluid bearing.

It is favorable if measurement takes place at normal pressure in order to thus obtain a measurement for the filling degree.

Moreover, it is favorable if the bearing is arranged in an evacuation chamber and (subsequent) measurement takes place at and/or during negative pressurization (under subatmospheric pressure). If there are air pockets in the lubricant this results in the lubricant being sprayed out of the bearing gap or the lubricant running up the walls of the bearing gap during evacuation (so-called "blow out"). Such a "blow out" can be identified using the method presented in the invention since the intensity profile is influenced, and in particular, reflection maxima disappear or change their position. Using the method according to the invention it is possible to make measurements on a time-resolved basis; this means that during evacuation it is possible to check whether the intensity profile at a specific measurement plane changes in time.

It is also favorable if another measurement is made during and/or after a transition from negative pressurization to normal pressurization (from subatmospheric pressure to atmospheric pressure). The intensity profile can then be determined and a comparison can accordingly be made to the negatively pressurized situation or to the initial situation at normal pressurization. If under normal pressurization after the transition from a negative pressurization situation, there are changes compared to the original normal pressurization situation, particularly with regard to the distance between reflection maxima, this suggests a loss of lubricant due to negative pressurization.

It is favorable if the bearing gap is illuminated with parallel light. This enables the bearing gap to be evenly illuminated and defined reflection lines to be obtained from whose intensity profile the filling level can be determined in accordance with the invention.

In particular, the bearing gap is exposed to light at an acute angle ($\alpha$) with respect to the longitudinal axis of a shaft of the fluid bearing. The acute angle $\alpha$ can be in the order of magnitude of 4°. The light is admitted in such a way that it can be reflected off the shaft. Admitting the light in this way makes it possible to obtain two reflection peaks, one being attributable to the light reflection off the vertex region of a meniscus-shaped lubricant level. The second maximum results from the reflection off a recess in the shaft and in particular off an edge of this recess. The position of the first maximum greatly depends on the position of the meniscus, that is on the oil level. The second maximum depends on the form of the shaft. This form is independent of the oil level, so that the position of this maximum in the measurement plane is independent of the oil level. The distance between the two maxima thus go to determine the oil level.

Provision can also be made for the measurement plane to be inclined at an acute angle with respect to a plane perpendicular to the longitudinal axis of a shaft of the fluid bearing and particularly inclined in the same acute angle as light is directed into the bearing gap with respect to the longitudinal axis of the shaft. This means that the measurement plane then lies essentially perpendicular to the admitted light; the measured intensity profile can then be easily attributed to a filling degree.

It is favorable if the acute angle is smaller than half an aperture angle of a conical region of the bearing gap. This enables well-formed (relative) reflection maxima to be achieved for oil reflection.

The following description of a preferred embodiment in conjunction with the drawings serves to explain the invention in more detail.

BRIEF DESCRIPTION OF THE DRAWINGS

FIG. 2 a view of the bearing from above according to FIG. 1 with a measurement area A;

FIG. 3 a reflected light record for measurement area A according to FIG. 2;

DETAILED DESCRIPTION OF THE INVENTION

Figure 1:
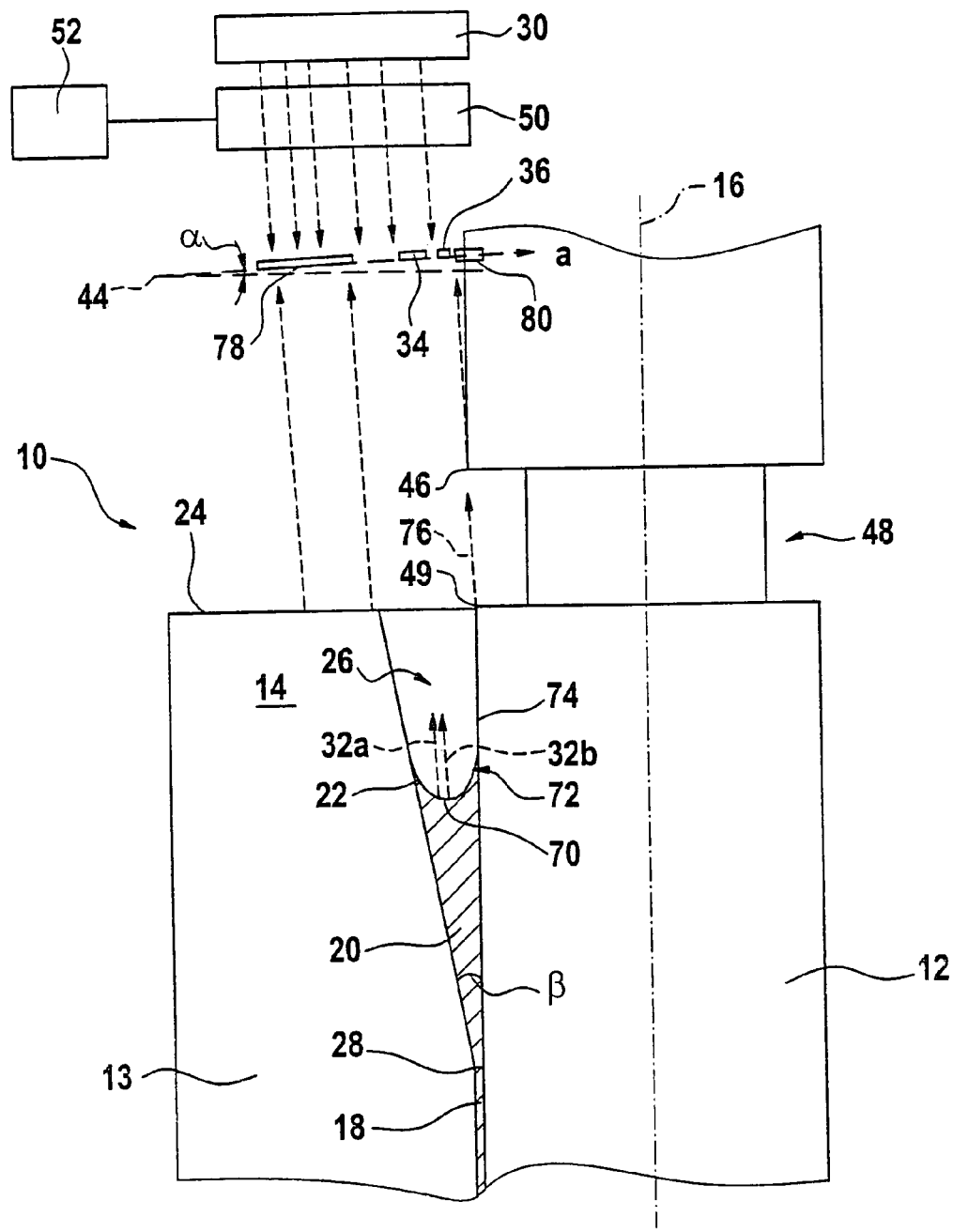
FIG. 1 a schematic partial sectioned view of a fluid bearing for which the filling degree of the lubricant is determined using the method according to the invention.

A fluid bearing, shown schematically in FIG. 1 in a partial sectioned view and indicated there in its entirety by 10, includes a shaft 12 which is rotatably supported in a shaft receptacle 14 formed on a bearing sleeve 13. The shaft 12 extends in a longitudinal axis 16 and is formed rotationally symmetric around this axis 16 outside a possible swirling device. The shaft receptacle 14 also extends in this longitudinal axis 16 and is likewise formed rotationally symmetric around this axis 16 outside a possible swirling device.

A gap 18, that is the bearing gap, is formed between the shaft 12 and the shaft receptacle 14. In a fluid bearing, this bearing gap 18 is filled with a lubricant 20, particularly a lubricating oil.

The lubricant 20 has a filling level 22 that has to be set at tight tolerances during manufacture of the fluid bearing 10 in order to ensure the functionality of the fluid bearing.

The bearing gap 18 has a region 26 tapering away conically from the axis 16 and widening towards one end 24 of the shaft receptacle 14. The inside diameter of the shaft receptacle 14 is larger at the end of the region 26 that lies at the end 24 of the shaft receptacle 14 than at the opposite end 28 of the tapered region 26. With respect to the shaft receptacle 14, the region 26 takes on the shape of a hollow cone with an aperture angle $2\beta$. A typical order of magnitude for $\beta$ is 10°. From end 28 downwards, the shaft receptacle 14 takes the shape of a hollow cylinder.

To measure the filling degree, the bearing gap 18 is illuminated with one or more light sources 30 being arranged at a distance to the fluid bearing 10. The light source 30 is arranged and formed in such a way that the bearing gap 18 can be evenly illuminated, particularly with mostly parallel light.

Light from the light source 30 is reflected back from the lubricant level 22. This is schematically illustrated in FIG. 1 on the basis of light beams 32a, 32b which are reflected back from the meniscus-shaped lubricant level 22. The back-reflected light is characteristic for the lubricant level: with a suitably illuminated bearing gap 18 and adequate observation, two spaced apart reflection maxima 34, 36 are produced. The distance between these reflection maxima 34, 36 is characteristic for the filling level. If the filling level is lower, then reflection maxima 34, 36 are produced whose distance apart is smaller.

The distance between the reflection maxima makes it possible for the filling degree of the bearing gap 18 to be qualitatively and/or quantitatively determined, particularly where there is appropriate calibration.

In accordance with the invention, provision is made for the spatial intensity profile of the back-reflected light to be registered on a defined measurement plane 44. The measurement plane 44 is preferably defined vis-à-vis a reference point of the fluid bearing 10. Such a reference point 46 is provided, for example, by an annular recess 48 in the shaft 12 having a front edge 49, the recess 48 being disposed above the bearing gap 18.

The line profile is recorded spatially resolved in the measurement plane 44, a stationary camera 50, and in particular a CCD camera, being preferably provided.

The analysis takes place automatically and particularly on a computer-supported basis via an analysis device 52.

The back-reflected light is registered in a measurement area A as a measurement plane which represents a section of a measurement plane region around the bearing gap 18 (FIG. 2). In order to record the entire circumference of the bearing gap 18, the camera 50 is preferably held stationary and the fluid bearing 10 is turned between measurements in stages around an axis that coincides with the longitudinal axis 16.

FIG. 3 shows a typical measurement result (for a stationary fluid bearing 10): the camera registers a clearly visible first reflection line 54 and a second reflection line 56 spaced apart. The intensity profile is spatially determined in a defined measurement window 58. The measurement window 58 is adjusted in such a way that a main reflection line, reflection line 54 for example, is focussed and the optical system, consisting of the light source 30 and the camera 50, is adjusted accordingly. The distance between the camera 50 and the fluid bearing 10 is adjusted in particular and the light source 30 is positioned in such a way that a clear image (corresponding to FIG. 3) is produced. The camera position is then adjusted further in an X and Y direction so that the center 60 of the measurement window lies in the middle between reflection lines 54 and 56. This setting is then held for a specific type of fluid bearing 10. (FIG. 3 shows an intermediate setting in which the center 60 of the measurement window 58 does not yet lie exactly between the reflection lines 54 and 56.)

This procedure ensures that a correct adjustment between light source 30, camera 50 and measured object 10 is realized in order to achieve optimal analyzability. An adjustment to the contrast can also be made in the measurement window 58 in this way, and in particular, made automatically which means a kind of self-calibration is achieved.

If digital filters are provided for the analysis of the spatial intensity profile, focussing on the reflection line 54 is carried out with the filter switched off. The adjustment to the position of the camera 50 to set the center 60 of the measurement window 58 between the two reflection lines 54 and 56 is made with an activated filter.

The camera 50 determines the spatial intensity profile in the measurement plane 44. This intensity profile is analyzed in the measurement window 58 particularly along the measurement line 62 (which lies within the measurement window 58). Such a measurement line 62 preferably lies radially with respect to the longitudinal axis 16.

Figure 4:
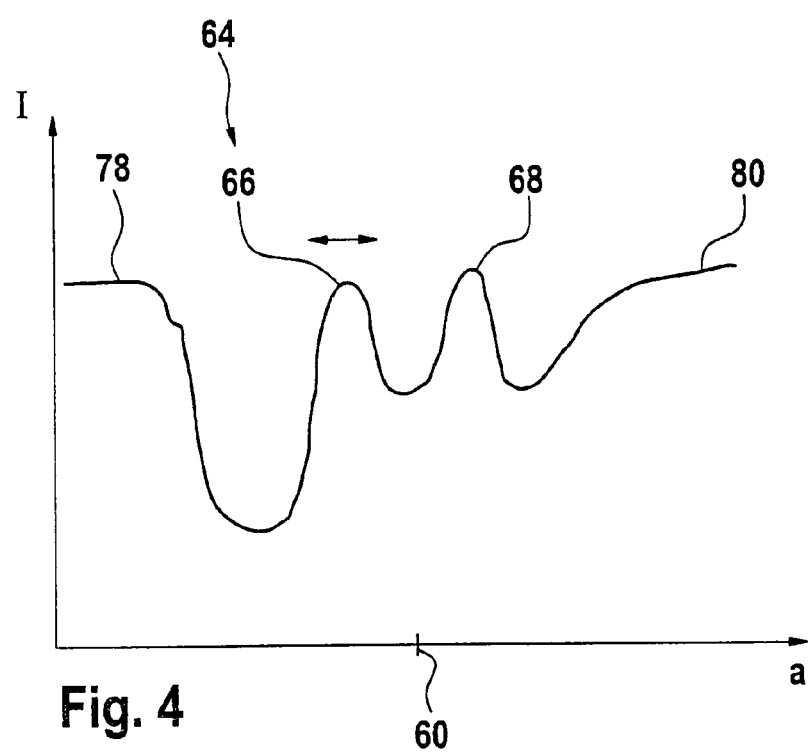
FIG. 4 a first example of a spatial intensity profile.

FIG. 4 shows an example of a registered spatial intensity profile 64 as a function of distance a, resulting from a lubricant distribution as shown in FIG. 1. The abscissa direction is a distance direction in the measurement plane 44. The zero point for this distance a is set arbitrarily. Such an intensity profile is analyzed using image processing techniques, it being also possible to employ digital filters particularly for the non-linearization of the profile. In FIG. 4, a first relative maximum 66 and a second relative maximum 68 can be recognized. The first relative maximum 66 corresponds to reflection line 54 and the second relative maximum 68 corresponds to reflection line 56.

The first relative maximum 66 can be attributed to the reflection in a vertex region 70 of the meniscus-shaped filling level. It corresponds to the reflection maximum 34 shown in FIG. 1. The position of the first maximum depends on the lubricant level, i.e. the position of the meniscus of the filling level 22.

The second relative maximum 68 corresponds to reflection maximum 36 shown in FIG. 1. It can be attributed to a reflection off the recess 48 and particularly in the area of its front edge 49. This second relative maximum 68 is fixed, i.e. its position in the measurement plane 44 is independent of the lubricant level. The distance between the two relative maxima 66 and 68 thus characterize the lubricant level.

The light to which the gap 18 is exposed is preferably directed at a small acute angle α with respect to the longitudinal axis 16. The angle α is in the order of magnitude of 4°, for example. At the acute angle α, light beams hit a wall 74 of the shaft 12 lying parallel to the longitudinal axis 16. Angle α is preferably smaller than angle β of the tapered region 26 between the shaft 12 and the shaft receptacle 14.

FIG. 1 shows a reflected light beam 76 which is reflected off the recess 48 and in particular off its front edge 49.

The peaks 66 and 68 lie between intensity regions 78 and 80 (FIGS. 1, 3 and 4) and can be attributed to the reflection of the light off the end 24 of the shaft receptacle 14 (intensity region 78) and to the reflection off the shaft 12 particularly above the recess 48 (intensity region 80).

The measurement plane 44 is preferably inclined corresponding to the above-mentioned acute angle α to a plane perpendicular to the longitudinal axis 16 so that the measurement plane 44 is perpendicular to the light beams.

The analysis device 52 now analyzes the intensity profile 64 in order to determine the distance between the two maxima 66 and 68, as a result of which a measurement for the filling degree of the bearing gap 18 can be obtained. To do this, the intensity profile data, for example, is converted into numerical data using image processing techniques, and an averaging procedure is carried out. Furthermore, half-width values can be ascertained. The analysis device 52 thus enables the distance between the two maxima 66, 68 to be determined automatically and particularly on a computer-supported basis.

Figure 5:
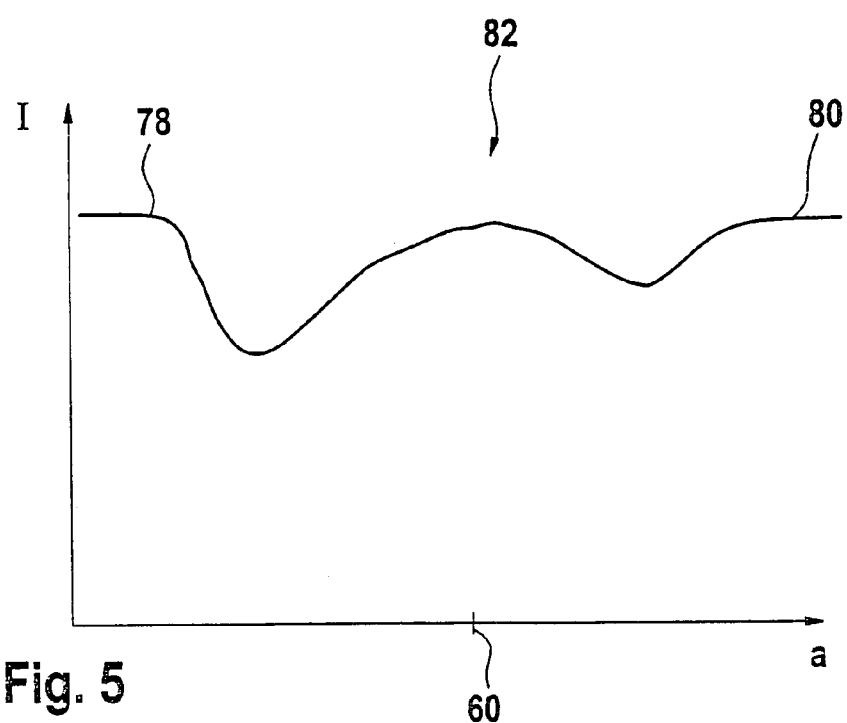
FIG. 5 a second example of a spatial intensity profile.

The intensity profile 64 shown in FIG. 4 has the typical waveform for an oil reflection. An intensity profile 82 is shown in FIG. 5 whose waveform is typical for wall reflection. A first maximum that can be attributed to lubricant reflection can no longer be formed. The back-reflected light is not reflected predominantly from lubricant but rather from walls that enclose the bearing gap 18, that means it is mainly reflected back via the shaft 12 and the shaft receptacle 14.

Figure 6:
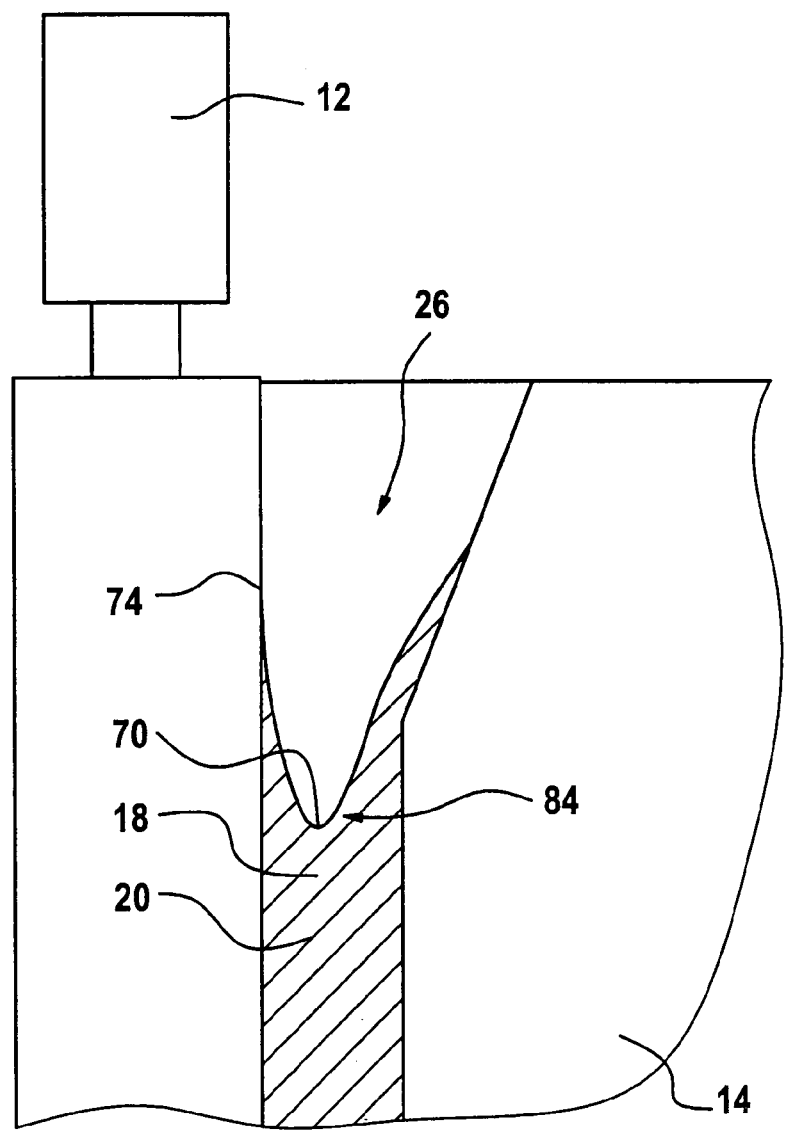
FIG. 6 a schematic view of a lubricant distribution in the bearing gap of a fluid bearing resulting in the intensity profile according to FIG. 5.

An example of a filling level that results in the intensity profile according to FIG. 5 is illustrated in FIG. 6: the lubricant 20 in the bearing gap 18 has a filling level 84 that lies below the tapered region 26. The lubricant has moved up the enclosing walls of the tapered region 26 compared to the case shown in FIG. 1. The underlying process that results in the kind of filling situation shown in FIG. 6 is also called a "blow out" and is described in more detail below. This situation does not produce two spaced apart relative maxima.

The method according to the invention allows the intensity profiles 64 and 82 to be differentiated from each other qualitatively (and quantitatively). This means that "blow out" cases in particular can be identified.

Provision is also made for the analysis device 52 to perform a plausibility test with respect to the distance values ascertained.

The method according to the invention enables the distances to be reproducibly determined with high precision.

Provision can be made that in order to determine the filling degree of the bearing gap 18 of a fluid bearing 10, first a measurement as described above is carried out under normal pressure and then the fluid bearing 10 is negatively pressurized. For this purpose, the fluid bearing 10 is positioned in an evacuation chamber so that negative pressure can be generated by evacuation. If there is air dissolved in the lubricant 20 in the bearing gap 18, then this air will be driven out through negative pressurization ("blow out"). This results in lubricant spraying out of the bearing gap 18, or as illustrated in FIG. 6, running up the walls enclosing the bearing gap 18. The method according to the invention enables this kind of "blow out" to be identified since a modified intensity profile as shown by way of example in FIG. 5 is produced.

Provision can be made that during evacuation in the evacuation chamber, the intensity profile is continuously measured in order to identify such a "blow out" on a time-resolved basis as well.

After negative pressurization, the evacuation chamber is ventilated again to create normal pressure conditions. Another measurement can then be taken. This goes, for example, to determine whether the measured value for the oil level is the same as before evacuation.

IDENTIFICATION REFERENCE LIST

10 Fluid bearing
12 Shaft
13 Bearing sleeve
14 Shaft receptacle
16 Longitudinal axis
18 Gap (bearing gap)
20 Lubricant
22 Filling level
24 End of the bearing sleeve
26 Conical region
28 End of the conical region
30 Light source
32a Light beams
32b Light beams
34 Relative reflection maximum
36 Relative reflection maximum
44 Measurement plane
46 Reference point
48 Recess
49 Recess front edge
50 Camera
52 Analysis device
54 First reflection line
56 Second reflection line
58 Measurement window
60 Center of the measurement window
62 Measurement line
64 Intensity profile
66 First relative maximum
68 Second relative maximum
70 Vertex region
72 Filling level fringe region
74 Shaft wall
76 Reflected light beam
78 Intensity region
80 Intensity region
82 Intensity profile
84 Filling level
$\alpha$ Angle of inclination of the measurement plane with respect to the transversal plane to the shaft
$\beta$ Half aperture angle of the tapered region
a Distance
I Intensity
A Measurement area

The invention claimed is:

1. A method to determine the lubricant filling degree of a fluid bearing, comprising:
   illuminating a bearing gap of the fluid bearing; and
   analyzing a luminous reflectance of reflected light from the bearing gap;
   wherein:
   a spatial intensity profile of the reflected light is recorded; and
   the intensity profile is analyzed with respect to a recognition of reflection maxima.

2. A method according to claim 1, wherein the spatial intensity profile is recorded in a defined measurement plane.

3. A method according to claim 2, wherein the measurement plane is defined with respect to a reference point of the fluid bearing.

4. A method according to claim 1, wherein the intensity profile is recorded using a stationary camera.

5. A method according to claim 1, wherein the intensity profile is recorded using a CCD camera.

6. A method according to claim 1, wherein a distance between reflection maxima is determined.

7. A method according to claim 1, wherein the analysis takes place in a pre-defined spatial measurement window.

8. A method according to claim 1, wherein the analysis is performed automatically.

9. A method according to claim 1, wherein the intensity profile is analyzed using image processing techniques.

10. A method according to claim 1, wherein a digital filter is used to analyze the intensity profile.

11. A method according to claim 1, wherein an optical system is set in such a way that a center of a spatial measurement window lies essentially in the middle between two relative reflection maxima.

12. A method according to claim 11, wherein contrast is adjusted automatically with respect to the positioned measurement window.

13. A method according to claim 1, wherein the bearing is turned between measurements of the lubricant filling degree.

14. A method according to claim 1, wherein measurement of the lubricant filling degree takes place under normal pressure.

15. A method according to claim 1, wherein the bearing is arranged in an evacuation chamber and measurement of the lubricant filling degree takes place at and/or during negative pressurization.

16. A method according to claim 14, wherein a measurement of the lubricant filling degree is made during and/or after a transition from negative pressurization to normal pressurization.

17. A method according to claim 1, wherein the bearing gap is illuminated with parallel light.

18. A method according to claim 1, wherein the bearing gap is exposed to light at an acute angle with respect to a longitudinal axis of a shaft of the fluid bearing.

19. A method according to claim 1, wherein a measurement plane is inclined at an acute angle with respect to a plane perpendicular to a longitudinal axis of a shaft of the fluid bearing.

20. A method according to claim 18, wherein the angle is smaller than half an aperture angle of a conical region of the bearing gap.

21. A method to determine the lubricant filling degree of a fluid bearing, comprising:
 illuminating a bearing gap of the fluid bearing; and
 analyzing a luminous reflectance of reflected light from the bearing gap;
 wherein:
  a spatial intensity profile of the reflected light is recorded; and
  the bearing gap is exposed to light at an acute angle with respect to a longitudinal axis of a shaft of the fluid bearing.

22. A method to determine the lubricant filling degree of a fluid bearing, comprising:
 illuminating a bearing gap of the fluid bearing; and
 analyzing a luminous reflectance of reflected light from the bearing gap;
 wherein:
  a spatial intensity profile of the reflected light is recorded; and
  a measurement plane is inclined at an acute angle with respect to a plane perpendicular to a longitudinal axis of a shaft of the fluid bearing.

* * * * *